(12) United States Patent
Langen et al.

(10) Patent No.: US 8,219,697 B2
(45) Date of Patent: Jul. 10, 2012

(54) DIAMETER PROTOCOL AND SH INTERFACE SUPPORT FOR SIP SERVER ARCHITECTURE

(75) Inventors: Anno R. Langen, Berkeley, CA (US); David Connelly, San Francisco, CA (US); Rao Nasir Khan, Fremont, CA (US); Ioannis Cosmadopoulos, San Francisco, CA (US); Jaroslaw Wilkiewicz, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 793 days.

(21) Appl. No.: 11/750,261

(22) Filed: May 17, 2007
(Under 37 CFR 1.47)

(65) Prior Publication Data
US 2008/0127232 A1    May 29, 2008

Related U.S. Application Data

(60) Provisional application No. 60/800,949, filed on May 17, 2006.

(51) Int. Cl.
*G06F 15/16* (2006.01)
*G06F 15/167* (2006.01)
*G06F 15/177* (2006.01)
*G06F 15/173* (2006.01)
*G06F 9/00* (2006.01)
*G06F 9/44* (2006.01)
*G06F 9/46* (2006.01)
*G06F 13/00* (2006.01)

(52) U.S. Cl. ........ 709/230; 719/311; 719/313; 719/315; 709/220

(58) Field of Classification Search .................... None
See application file for complete search history.

(56) References Cited

U.S. PATENT DOCUMENTS

| | | | |
|---|---|---|---|
| 5,325,360 A | 6/1994 | Friedrich | |
| 5,440,727 A | 8/1995 | Bhide et al. | |
| 5,590,288 A | 12/1996 | Castor et al. | |
| 5,659,596 A | 8/1997 | Dunn | |
| 5,675,800 A | 10/1997 | Fisher et al. | |
| 5,832,487 A * | 11/1998 | Olds et al. | ......... 1/1 |
| 5,941,999 A | 8/1999 | Matena et al. | |
| 5,963,974 A | 10/1999 | Arimill et al. | |
| 6,012,059 A | 1/2000 | Neimat et al. | |

(Continued)

OTHER PUBLICATIONS

Magedanz et al., The IMS playground @ FOKUS—an open testbed for generation network multimedia services, Issue Date : Feb. 23-25, 2005, pp. 1 and 6.*

(Continued)

*Primary Examiner* — Andy Ho
*Assistant Examiner* — Craig Dorais
(74) *Attorney, Agent, or Firm* — Fliesler Meyer LLP

(57) ABSTRACT

A SIP server can be distributed over a cluster network and handle the processing of various SIP communications. A Diameter protocol web application can be deployed on the engine tier of the SIP server for enabling communication between the SIP server and an HSS. A profile service API can be provided that allows applications running on the SIP server to access user profile data stored on the HSS. The applications can also be allowed to subscribe to notifications about changes to the user profile data on the HSS. An Sh interface provider can be deployed on the SIP server for generating and responding to Diameter command codes. SIP servlets can access the user profile data in the form of an XML document.

17 Claims, 8 Drawing Sheets

U.S. PATENT DOCUMENTS

| | | | |
|---|---|---|---|
| 6,052,724 | A | 4/2000 | Willie et al. |
| 6,067,301 | A | 5/2000 | Aatresh |
| 6,134,673 | A | 10/2000 | Chrabaszcz |
| 6,208,870 | B1 | 3/2001 | Lorello et al. |
| 6,226,686 | B1 | 5/2001 | Rothschild et al. |
| 6,279,076 | B1 | 8/2001 | Shishido et al. |
| 6,292,833 | B1 | 9/2001 | Liao et al. |
| 6,304,949 | B1 | 10/2001 | Houlsdworth |
| 6,335,927 | B1 | 1/2002 | Elliot et al. |
| 6,480,862 | B1 | 11/2002 | Gall |
| 6,557,038 | B1 | 4/2003 | Becker et al. |
| 6,578,076 | B1 | 6/2003 | Putzolu |
| 6,611,867 | B1 | 8/2003 | Bowman-Amuah |
| 6,621,793 | B2 | 9/2003 | Widegren et al. |
| 6,625,705 | B2 | 9/2003 | Yanai et al. |
| 6,625,751 | B1 | 9/2003 | Starovic et al. |
| 6,629,260 | B1 | 9/2003 | Dancer et al. |
| 6,701,519 | B1 | 3/2004 | Cowan |
| 6,704,933 | B1 | 3/2004 | Tanaka et al. |
| 6,708,206 | B1 | 3/2004 | Thrane et al. |
| 6,721,286 | B1 | 4/2004 | Williams et al. |
| 6,747,970 | B1 | 6/2004 | Lamb et al. |
| 6,801,604 | B2 * | 10/2004 | Maes et al. ............... 379/88.17 |
| 6,823,477 | B1 | 11/2004 | Cheng et al. |
| 6,862,689 | B2 | 3/2005 | Bergsten et al. |
| 6,888,828 | B1 * | 5/2005 | Partanen et al. ............ 370/389 |
| 6,904,140 | B2 | 6/2005 | Trossen |
| 6,961,776 | B1 | 11/2005 | Buckingham et al. |
| 6,965,777 | B1 | 11/2005 | Cast et al. |
| 6,988,133 | B1 | 1/2006 | Zavalkovsky et al. |
| 7,039,037 | B2 | 5/2006 | Wang et al. |
| 7,050,424 | B2 | 5/2006 | Cheng et al. |
| 7,058,046 | B2 | 6/2006 | Celi, Jr. et al. |
| 7,073,090 | B2 | 7/2006 | Yanai et al. |
| 7,076,562 | B2 | 7/2006 | Singhal et al. |
| 7,082,102 | B1 | 7/2006 | Wright |
| 7,089,307 | B2 | 8/2006 | Zintel et al. |
| 7,140,012 | B2 | 11/2006 | Pugh et al. |
| 7,142,876 | B2 | 11/2006 | Trossen et al. |
| 7,237,239 | B1 | 6/2007 | Goel et al. |
| 7,246,256 | B2 | 7/2007 | De La Cruz et al. |
| 7,283,539 | B2 | 10/2007 | Wang et al. |
| 7,301,905 | B1 | 11/2007 | Tontiruttananon et al. |
| 7,330,899 | B2 | 2/2008 | Wong |
| 7,380,073 | B2 | 5/2008 | Shorb |
| 7,392,421 | B1 | 6/2008 | Bloomstein et al. |
| 7,406,618 | B2 | 7/2008 | Fung et al. |
| 7,464,178 | B2 | 12/2008 | Corrigan et al. |
| 7,506,194 | B2 | 3/2009 | Appanna et al. |
| 7,516,450 | B2 | 4/2009 | Ogura |
| 7,529,805 | B2 | 5/2009 | Martinez et al. |
| 7,554,992 | B2 | 6/2009 | Kimura et al. |
| 7,606,839 | B2 | 10/2009 | Aronoff et al. |
| 7,747,995 | B2 | 6/2010 | Fritsch et al. |
| 7,813,299 | B2 | 10/2010 | Yumoto et al. |
| 7,913,244 | B2 | 3/2011 | Zotter et al. |
| 2001/0030970 | A1 | 10/2001 | Wiryaman et al. |
| 2002/0036983 | A1 | 3/2002 | Widegren et al. |
| 2002/0039352 | A1 | 4/2002 | El-Fekih et al. |
| 2002/0048269 | A1 * | 4/2002 | Hong et al. ................... 370/389 |
| 2002/0065034 | A1 * | 5/2002 | Zhang ........................ 455/2.01 |
| 2002/0073211 | A1 | 6/2002 | Lin et al. |
| 2002/0073404 | A1 | 6/2002 | Sokolov et al. |
| 2002/0075844 | A1 * | 6/2002 | Hagen ......................... 370/351 |
| 2002/0077134 | A1 | 6/2002 | Mizell et al. |
| 2002/0129174 | A1 | 9/2002 | LaBaw |
| 2002/0144119 | A1 | 10/2002 | Benantar |
| 2002/0147749 | A1 * | 10/2002 | Ortiz et al. .................... 707/523 |
| 2002/0159387 | A1 | 10/2002 | Allison et al. |
| 2003/0028529 | A1 | 2/2003 | Cheung et al. |
| 2003/0033524 | A1 | 2/2003 | Tran et al. |
| 2003/0055920 | A1 | 3/2003 | Kakadia et al. |
| 2003/0093695 | A1 | 5/2003 | Dutta |
| 2003/0095540 | A1 | 5/2003 | Mulligan et al. |
| 2003/0120593 | A1 | 6/2003 | Bansal et al. |
| 2003/0125021 | A1 | 7/2003 | Tell et al. |
| 2003/0131116 | A1 | 7/2003 | Jain et al. |
| 2003/0158908 | A1 | 8/2003 | Jacobs et al. |
| 2003/0163761 | A1 | 8/2003 | Chen et al. |
| 2003/0165135 | A1 | 9/2003 | Itzkovitz et al. |
| 2003/0227894 | A1 | 12/2003 | Wang et al. |
| 2003/0227926 | A1 | 12/2003 | Ramamurthy et al. |
| 2004/0002881 | A1 | 1/2004 | Hu et al. |
| 2004/0086102 | A1 | 5/2004 | McMurry et al. |
| 2004/0116117 | A1 | 6/2004 | Ahvonen et al. |
| 2004/0117794 | A1 | 6/2004 | Kundu |
| 2004/0139204 | A1 | 7/2004 | Ergezinger et al. |
| 2004/0148357 | A1 | 7/2004 | Corrigan et al. |
| 2004/0152439 | A1 | 8/2004 | Kimura et al. |
| 2004/0160911 | A1 | 8/2004 | Zilliacus et al. |
| 2004/0168162 | A1 | 8/2004 | Park et al. |
| 2004/0172421 | A1 | 9/2004 | Saito et al. |
| 2004/0196858 | A1 | 10/2004 | Tsai et al. |
| 2004/0213156 | A1 | 10/2004 | Smallwood |
| 2004/0218619 | A1 | 11/2004 | Salo |
| 2004/0223602 | A1 | 11/2004 | Honkasalo et al. |
| 2004/0230682 | A1 | 11/2004 | Immonen |
| 2004/0233866 | A1 | 11/2004 | Bossoli et al. |
| 2004/0246822 | A1 | 12/2004 | Wong |
| 2004/0246947 | A1 | 12/2004 | Wong |
| 2004/0260967 | A1 | 12/2004 | Guha et al. |
| 2004/0267882 | A1 | 12/2004 | Whynot et al. |
| 2005/0005022 | A1 | 1/2005 | Taylor |
| 2005/0022047 | A1 | 1/2005 | Chandrasekaran |
| 2005/0022210 | A1 | 1/2005 | Zintel et al. |
| 2005/0025050 | A1 | 2/2005 | Roeder |
| 2005/0038828 | A1 | 2/2005 | Kaluskar et al. |
| 2005/0038836 | A1 | 2/2005 | Wang |
| 2005/0044188 | A1 | 2/2005 | Nakazawa et al. |
| 2005/0044233 | A1 | 2/2005 | Cai et al. |
| 2005/0091362 | A1 | 4/2005 | Shigeta et al. |
| 2005/0097367 | A1 | 5/2005 | Nakazawa et al. |
| 2005/0117576 | A1 | 6/2005 | McDysan et al. |
| 2005/0117602 | A1 | 6/2005 | Carrigan et al. |
| 2005/0152336 | A1 | 7/2005 | Bratt et al. |
| 2005/0174950 | A1 | 8/2005 | Ayyagari |
| 2005/0185661 | A1 | 8/2005 | Scott et al. |
| 2005/0203962 | A1 | 9/2005 | Zhou et al. |
| 2005/0203994 | A1 | 9/2005 | Palmer et al. |
| 2005/0207432 | A1 | 9/2005 | Velez-Rivera et al. |
| 2005/0226225 | A1 | 10/2005 | Shigeta |
| 2005/0237999 | A1 | 10/2005 | Shores et al. |
| 2005/0259806 | A1 | 11/2005 | Chang |
| 2005/0262499 | A1 | 11/2005 | Read |
| 2005/0265276 | A1 | 12/2005 | Takeda et al. |
| 2005/0281251 | A1 | 12/2005 | Yumoto et al. |
| 2006/0002333 | A1 | 1/2006 | Skog et al. |
| 2006/0010224 | A1 | 1/2006 | Sekar et al. |
| 2006/0069776 | A1 | 3/2006 | Shim et al. |
| 2006/0090097 | A1 | 4/2006 | Ngan et al. |
| 2006/0109818 | A1 | 5/2006 | Ramanna et al. |
| 2006/0128409 | A1 | 6/2006 | Gress et al. |
| 2006/0153068 | A1 | 7/2006 | Dally et al. |
| 2006/0174271 | A1 | 8/2006 | Chen et al. |
| 2006/0225108 | A1 | 10/2006 | Tabassi et al. |
| 2006/0233182 | A1 | 10/2006 | Appanna et al. |
| 2006/0288086 | A1 | 12/2006 | Gopalakrishnan et al. |
| 2007/0005766 | A1 | 1/2007 | Singhal et al. |
| 2007/0011617 | A1 | 1/2007 | Akagawa et al. |
| 2007/0091874 | A1 | 4/2007 | Rockel et al. |
| 2007/0100981 | A1 * | 5/2007 | Adamczyk et al. ........... 709/223 |
| 2007/0169170 | A1 | 7/2007 | Shiran |
| 2007/0195779 | A1 | 8/2007 | Judge et al. |
| 2007/0208862 | A1 | 9/2007 | Fox et al. |
| 2007/0220302 | A1 | 9/2007 | Cline et al. |
| 2007/0288915 | A1 | 12/2007 | Zotter et al. |
| 2008/0021939 | A1 | 1/2008 | Dahlstedt et al. |
| 2008/0046963 | A1 | 2/2008 | Grayson et al. |
| 2008/0098117 | A1 | 4/2008 | Fukuhara et al. |
| 2008/0126832 | A1 | 5/2008 | Morosan et al. |
| 2008/0134165 | A1 | 6/2008 | Anderson et al. |
| 2008/0141239 | A1 | 6/2008 | Larsson et al. |
| 2008/0144630 | A1 | 6/2008 | Hayashida et al. |
| 2008/0147551 | A1 | 6/2008 | Connelly et al. |
| 2008/0178169 | A1 | 7/2008 | Grossner et al. |
| 2008/0189421 | A1 | 8/2008 | Langen et al. |
| 2008/0225835 | A1 | 9/2008 | Oda et al. |

| | | | |
|---|---|---|---|
| 2008/0256257 A1 | 10/2008 | Miller et al. |
| 2008/0294731 A1 | 11/2008 | Roy |
| 2009/0187901 A1 | 7/2009 | Kanai |
| 2010/0175059 A1 | 7/2010 | Wetherly et al. |

OTHER PUBLICATIONS

Kristensen, A., "SIP Servlet API Version 1.0," Internet article [online], Feb. 4, 2003, http://jcp.org/en/jsr/detail?id=116> [retrieved on Mar. 6, 2009], p. 1-section 1, p. 4-section 1.4.2.

O'Doherty, P. et al., "SIP and the Java Platforms," Internet article [online], Jun. 2003, Sun Microsystems homepage, http://java.sun.com/productsfiain/SIP-and-Java.html> [retrieved on Mar. 6, 2009], sections 1, 2.2, 4, 6.

Zhuang et al , Policy Based QoS Architecture in the IP Multimedia Subsystem of UMTS, IEEE Network, May/Jun. 2003, pp. 51-57.

Coward et al., Java Servlet Specification v2.4, Nov. 24, 2003, pp. 1-330.

Kristensen et al., SIP Servlet API v1.0, Feb. 4, 2003, pp. 2-3, 5-120.

Rosenberg et al., Best Current Practices for Third Party Call Control in the SIP, Apr. 2004, Network Working Group, RFC 3725, pp. 1-32.

International Search Report and Written Opinion for PCT/US06/11429 dated Aug. 7, 2007, 7 pages.

International Search Report and Written Opinion for PCT/US06/11165 dated Oct. 22, 2007, 7 pages.

BEA Systems, Inc., BEA WebLogic SIP Server: Configuaring and Managing WebLogic SIP Server; Dec. 2. 2005, BEA Systems, Inc., Version 2.1.

Kristensen, "SIP Servlet API Version 1.0." JSR Homepage, XP002517994, www.http://jcp.org.en.jsr.detail?id=116>(Feb. 4, 2004).

O'Doherty et al., "SIP and the Java Platforms," Sun Microsystems homepage, XP002517995, www.http://java.sun.com/products/jain.SIP-and_Java.html>(Jun. 2003).

Supplementary European Search report for European Application No. EP 06739796, dated Mar. 19, 2009.

International Search Report and Written Opinion for PCT/US07/69021 dated Jul. 25, 2003, 10 pages.

Olsen et al., "SIP Servlet Discussion," org.apache.tomcat.dev listserv archives: retrieved at http://markmail.org/search/?q=sip+servlet+httpsession+date%3A199811-200605 on Nov. 3, 2010, 5 pages.

Fasel et al., "The FOKUS Open SIP AS—A Service Platform for NGN," In Proceedings Kommunikation in Verteilten Systemen (KiVS), Mar. 2005, pp. 49-56.

Kassinen, "Group-Based Content Push with Dynamic Session Startup," MUM 2005 Christchurch, New Zealand, pp. 135-141.

Hiroyuki, "Virtual PC-Type Thin Client Ssytem," 2007 NEC Technical, pp. 42-47.

Garrels, "Is Linux Voice Over IP Ready?," Linux Journal archive, vol. 2006, Issue 145, May 2006, 10 pages.

Jiang, "Towards Junking the PBX: Deploying IP Telephony," 2001 ACM 1-58113-370-7/1/0006, pp. 177-185.

* cited by examiner

DIAMETER PROTOCOL AND SH INTERFACE SUPPORT FOR SIP SERVER ARCHITECTURE

CLAIM OF PRIORITY

The present application claims the benefit of U.S. Provisional Patent Application No. 60/800,949, entitled DIAMETER PROTOCOL AND SH INTERFACE SUPPORT FOR SIP SERVER ARCHITECTURE, by Anno R. Langen et al., filed on May 17, 2006, which is incorporated herein by reference in its entirety.

CROSS REFERENCE TO RELATED APPLICATIONS

The following commonly owned, United States Patents and Patent Applications, including the present application, are related to each other. Each of the other patents/applications are incorporated by reference herein in their entireties:

U.S. patent application Ser. No. 11/378,188, entitled SYSTEM AND METHOD FOR MANAGING COMMUNICATIONS SESSIONS IN A NETWORK, by Reto Kramer, et al., filed on Mar. 17, 2006 now U.S. Pat. No. 7,870,265, issued Jan. 11, 2011;

U.S. patent application Ser. No. 11/384,056, entitled SYSTEM AND METHOD FOR A GATEKEEPER IN A COMMUNICATIONS NETWORK, by Reto Kramer, et al., filed on Mar. 17, 2006;

U.S. Provisional Patent Application No. 60/801,091 entitled SIP AND HTTP CONVERGENCE IN NETWORK COMPUTING ENVIRONMENTS, by Anno R. Langen et al., filed on May 16, 2006;

U.S. Provisional Patent Application No. 60/800,943 entitled HITLESS APPLICATION UPGRADE FOR SIP SERVER ARCHITECTURE, by Anno R. Langen et al., filed on May 16, 2006;

U.S. Provisional Patent Application No. 60/801,083 entitled ENGINE NEAR CACHE FOR REDUCING LATENCY IN A TELEOMMUNICATIONS ENVIRONMENT, by Anno R. Langen et al., filed on May 16, 2006;

U.S. patent application Ser. No. 11/434,022 entitled SYSTEM AND METHOD FOR CONTROLLING DATA FLOW BASED UPON A TEMPORAL POLICY, by Narendra Vemula et al., filed on May 15, 2006, now U.S. Pat. No. 7,953,877, issued May 31, 2011;

U.S. patent application Ser. No. 11/434,024 entitled SYSTEM AND METHOD FOR CONTROLLING ACCESS TO LEGACY PUSH PROTOCOLS BASED UPON A POLICY, by Bengt-Inge Jakobsson et al., filed on May 15, 2006;

U.S. patent application Ser. No. 11/434,010 entitled SYSTEM AND METHOD FOR CONTROLLING ACCESS TO LEGACY MULTIMEDIA MESSAGE PROTOCOLS BASED UPON A POLICY, by Andreas E. Jansson, filed on May 15, 2006, now U.S. Pat. No. 7,957,403, issued Jun. 7, 2011;

U.S. patent application Ser. No. 11/434,025 entitled SYSTEM AND METHOD FOR CONTROLLING ACCESS TO LEGACY SHORT MESSAGE PEER-TO-PEER PROTOCOLS BASED UPON A POLICY, by Andreas E. Jansson, filed on May 15, 2006;

U.S. patent application Ser. No. 11/432,934 entitled SYSTEM AND METHOD FOR SHAPING TRAFFIC, by Jan Thomas Svensson, filed on May 12, 2006 now U.S. Pat. No. 7,788,386, issued Aug. 31, 2010.

FIELD OF THE INVENTION

The current invention relates generally to managing telecommunications and more particularly to providing diameter and sh interface support for an SIP server.

BACKGROUND

Conventionally, telecommunications and network infrastructure providers have relied on often decades old switching technology to providing routing for network traffic. Businesses and consumers, however, are driving industry transformation by demanding new converged voice, data and video services. The ability to meet these demands often can be limited by existing IT and network infrastructures that are closed, proprietary and too rigid to support these next generation services. As a result, telecommunications companies are transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

However, delivering these more sophisticated data services has proved to be more difficult than first imagined. Existing IT and network infrastructures, closed proprietary network-based switching fabrics and the like have proved to be too complex and too rigid to allow the creation and deployment of new service offerings. Furthermore, latency and migration of services have become important issues in addressing the processing of telecommunications, as more and more users expect seemingly instantaneous and uninterrupted access to their devices.

SUMMARY OF THE INVENTION

An SIP server can be distributed over a cluster network and handle the processing of various SIP communications. A Diameter protocol web application can be deployed on the engine tier of the SIP server for enabling communication between the SIP server and an HSS. A profile service API can be provided that allows applications running on the SIP server to access user profile data stored on the HSS. The applications can also be allowed to subscribe to notifications about changes to the user profile data on the HSS. An Sh interface provider can be deployed on the SIP server for generating and responding to Diameter command codes. SIP servlets can access the user profile data in the form of an XML document.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there is provided a system and method for providing Diameter protocol and Sh interface support for a session initiation protocol (SIP) server architecture. A SIP server, as described in the present disclosure, can be distributed over a cluster network and handle the processing of various SIP communications. In one embodiment, the SIP server includes an engine tier for processing a multitude of messages and transactions, as well as a state tier for maintaining the data associated with these transactions. A Diameter protocol web application can be deployed on the engine tier of the SIP server for enabling communication between the SIP server and an HSS. A profile service API can be provided that allows applications running on the SIP server to access user profile data stored on the HSS. The applications can also be allowed to subscribe to notifications about changes to the user profile data on the HSS. An Sh interface provider can be deployed on the SIP server for generating and responding to Diameter command codes. SIP servlets can access the user profile data in the form of an XML document.

Figure 1A:
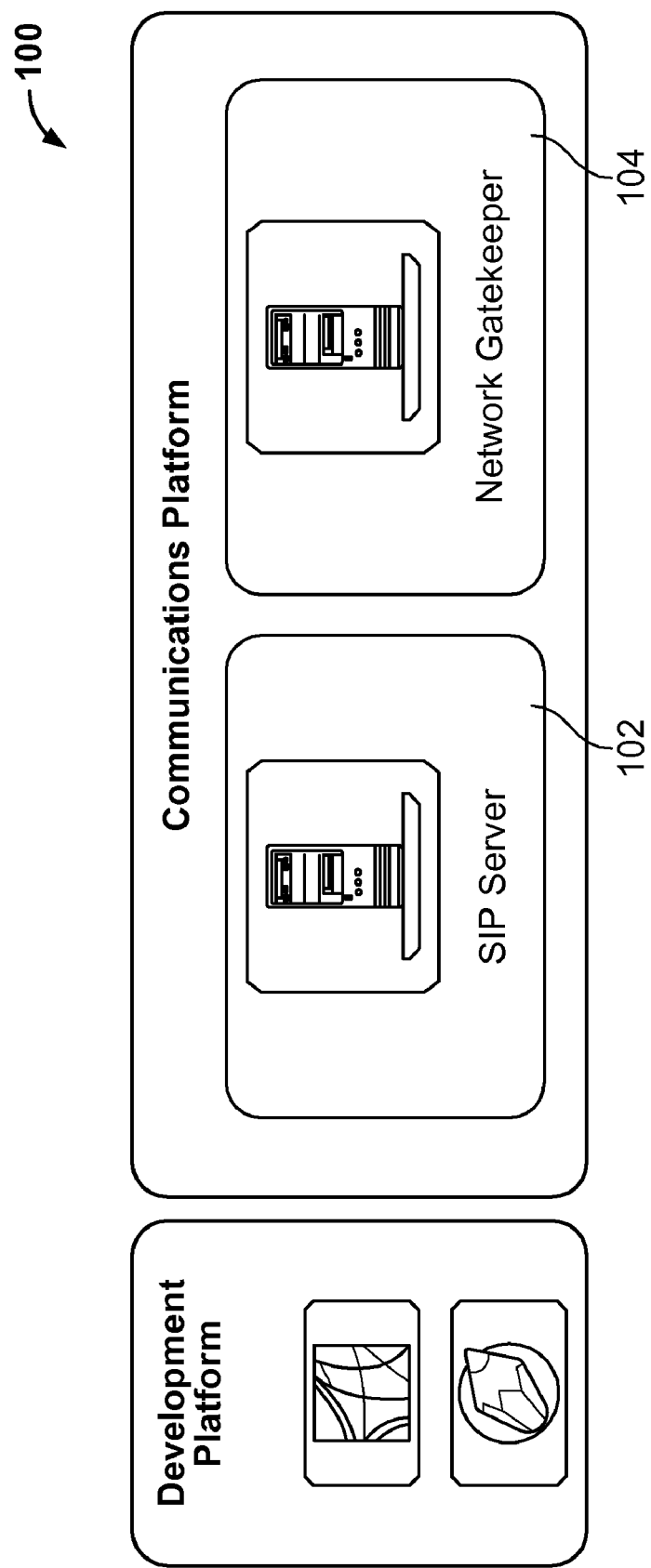
FIG. 1A is an exemplary illustration of a functional system layers in various embodiments.

FIG. 1A is an exemplary illustration of functional system layers in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

A Session Initiation Protocol (SIP) Server 102 and a Network Gatekeeper 104 can comprise a portfolio of products that collectively make up the Communications Platform 100. The SIP Server 102 provides the Communications Platform 100 with a subsystem in which application components that interact with SIP-based networks may be deployed. The Network Gatekeeper 104 provides a policy-driven telecommunications Web services gateway that allows granular control over access to network resources from un-trusted domains.

Figure 1B:
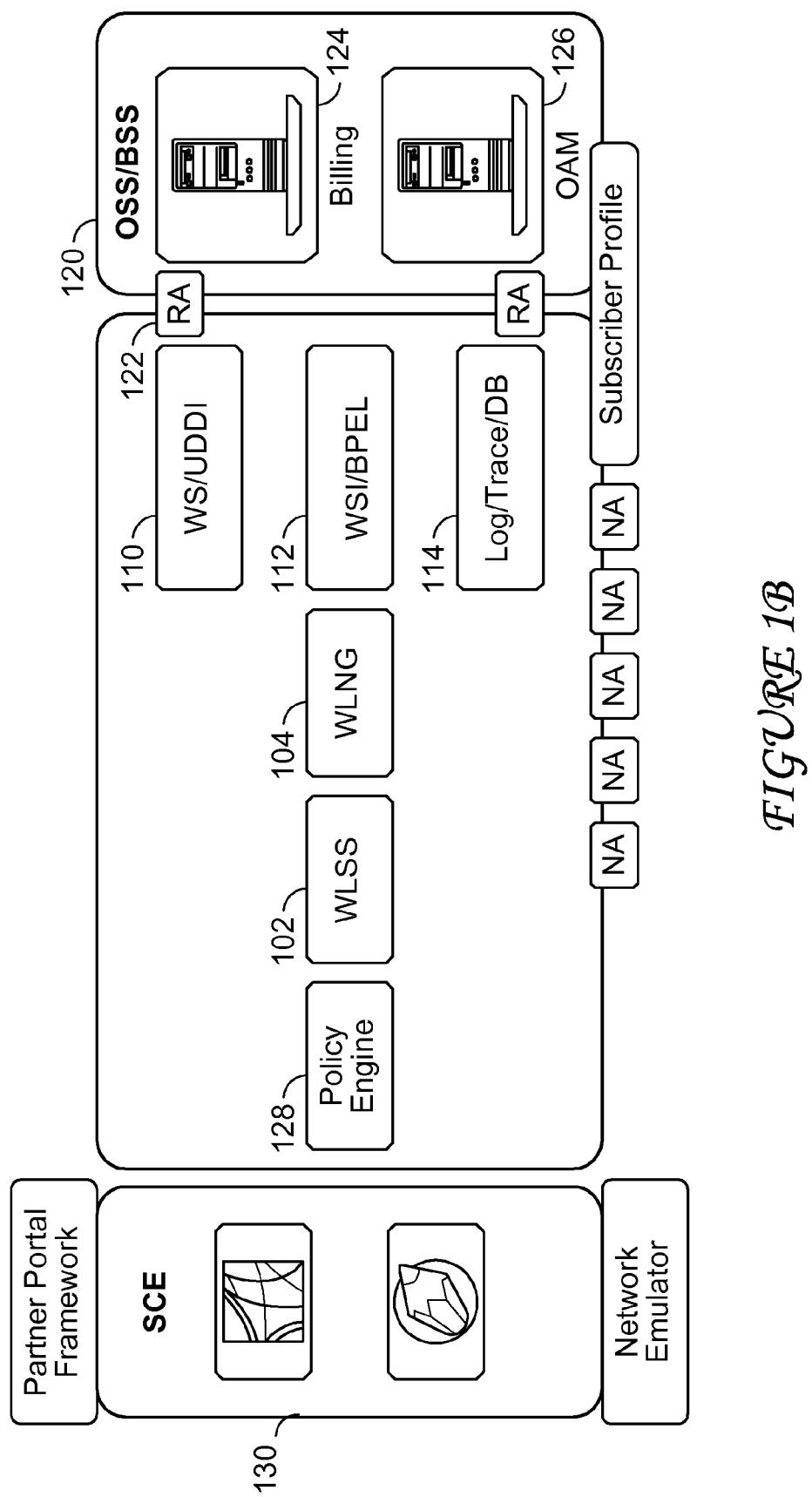
FIG. 1B is another exemplary illustration of functional system layers in a communications platform embodiment.

A variety of shared and re-usable software and service infrastructure components comprise the Communications Platform 100. For example, an Application Server, such as the WebLogic™ Application Server by BEA Systems, Inc. of San Jose, Calif. This Application Server may be augmented and adapted for deployment in telecommunications networks, while providing many features and functionality of the WebLogic Server counterpart widely deployed in enterprise computing environments. Application Server embodiments for use in the telecommunications applications can provide a variety of additional features and functionality, such as without limitation:

Optimized for Peak Throughput
Clustering for Scalability and High-Performance
Generalized for wide range of target platforms (HW/OS) support
Extensive deployment configuration options
Optimized for local management
Plug and play Enterprise Information Systems (EIS) support Analogously, communications platform embodiments can provide a variety of additional features and functionality, such as without limitation:

Highly Deterministic Runtime Environment
Clustering for High-Availability (HA) and Scalability
Optimized for Telecom HW/OS/HAM W platforms support (SAF, ATCA, HA M/W, etc.)
Hardened configuration
Optimized for Telecom NMS integration
Telecommunications network connectors and interfaces
Partitioning, replication and failover FIG. 1B is another exemplary illustration of functional system layers in a communications platform embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Communications platform 100 comprises a SIP Server (WLSS) 102 and a Network Gatekeeper (WLNG) 104. Tools for interacting with Web Services, such as a Web Service—Universal Description Discovery Interface (WS/UDDI) 110, a Web Service—Business Process Execution Language (WS/BPEL) 112 may be coupled to the SIP Server 102 and the Network Gatekeeper 104 in embodiments. A log/trace and database 114 can assist with troubleshooting. In some deployments, the Communications Platform 100 can interface with an OSS/BSS system 120 via resource adapters 122. Such interfaces can provide access to billing applications 124, Operation, Administration, and Maintenance (OAM) applications 126 and others. A policy engine 128 can control the activities of the above-described components which can be implemented in a scalable cluster environment (SCE) 130.

A Communications Platform embodiment can provide an open, high performance, software based fault-tolerant platform that allows operators to maximize revenue potential by shortening time to market and significantly reducing per-service implementation and integration cost and complexity. The Communications Platform is suitable for use by for Network Infrastructure Vendor, Network Operators and Communications Service Providers in multiple deployment scenarios ranging from fully IMS oriented network architectures to hybrid and highly heterogeneous network architectures. It is not restricted to use only in carrier networks, however, and may be deployed in Enterprise communications networks without restriction or extensive customization. When deployed in conjunction with an IP Multimedia Subsystem, the Communications Platform can serve in the role of an IMS SIP Application Server and offers Communications Service Providers an execution environment in which to host applications (such as the WebLogic Network Gatekeeper), components and standard service enablers.

Figure 1C:
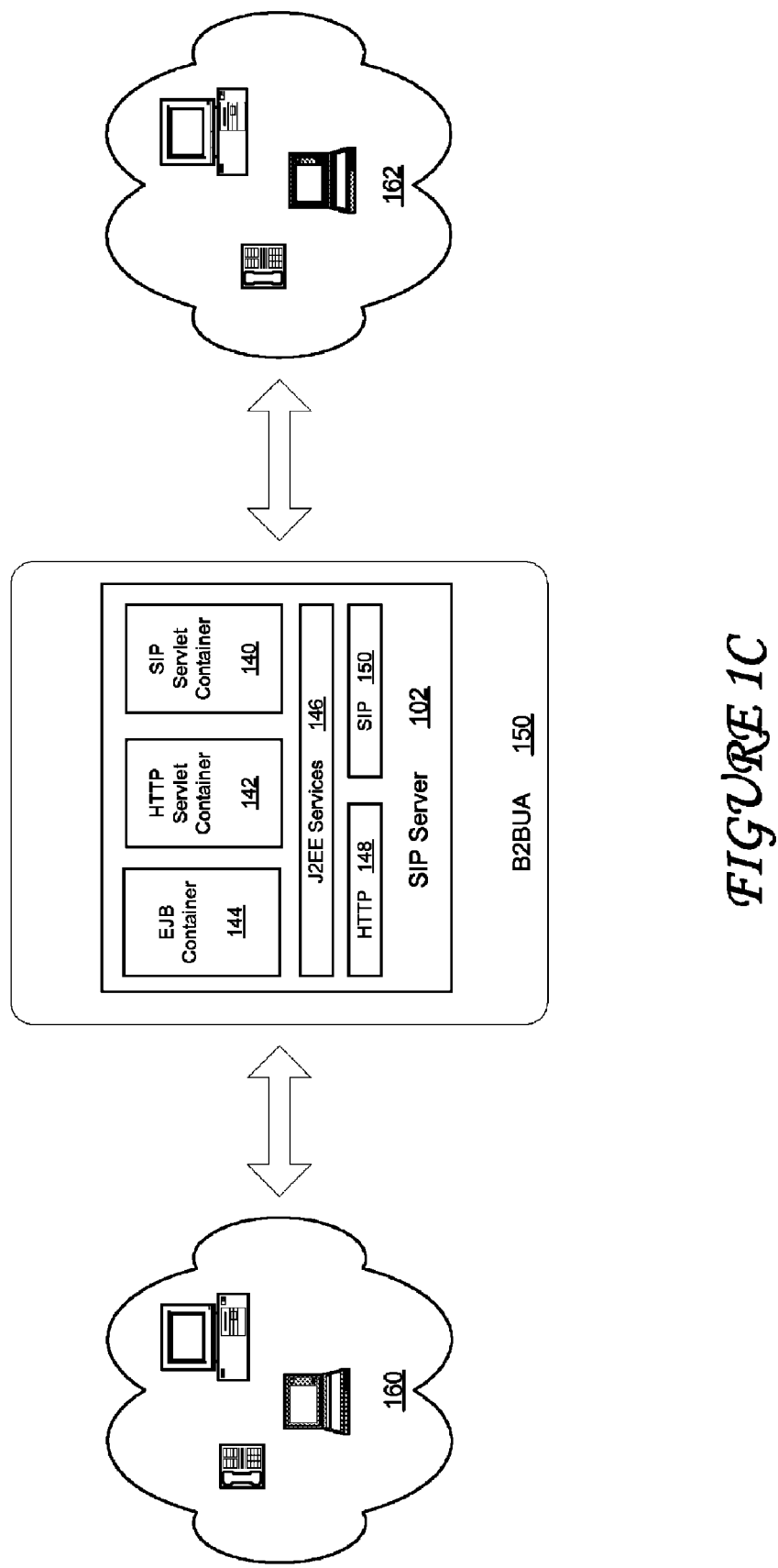
FIG. 1C is an exemplary illustration of a SIP server deployed in a production environment, in accordance with various embodiments.

FIG. 1C is an exemplary illustration of a SIP server deployed in a production environment, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the SIP server 102 can be used as a back-to-back user agent (B2BUA) 150 in a typical telecommunications environment. A B2BUA can take the place of an intermediary between communications between user agents 160, 162, including various cellular phones, wireless devices, laptops, computers, applications, and other components capable of communicating with one another electronically. The B2BUA 150 can provide multiple advantages, including controlling the flow of communication between user agents, enabling different user agents to communicate with one another (e.g. a web application can communicate with a cellular phone), as well as various security advantages. As an illustration, the user agents can transmit to the SIP server instead of communicating directly to each other and thus malicious users can be prevented from sending spam and viruses, hacking into other user agent devices, and otherwise compromising security.

The SIP server 102 can be implemented as a Java Enterprise Edition application server that has been extended with support for the session initiation protocol (SIP) as well as other operational enhancements that allow it to meet the demanding requirements of the next generation protocol-based communication networks. In one embodiment, the SIP server 102 can include an Enterprise Java Beans (EJB) container 144, a Hyper Text Transfer Protocol (HTTP) servlet container 142, an SIP servlet container 140, various Java 2 Enterprise Edition (J2EE) services 146, and SIP 150 and HTTP 148 components. The SIP stack of the server can be fully integrated into the SIP servlet container 140 and can offer much greater ease of use than a traditional protocol stack. A SIP servlet Application Programming Interface (API) can be provided in order to expose the full capabilities of the SIP protocol in the Java programming language. The SIP servlet API can define a higher layer of abstraction than simple protocol stacks provide and can thereby can free up the developer from concern about the mechanics of the SIP protocol itself. For example, the developer can be shielded from syntactic validation of received requests, handling of transaction layer timers, generation of non application related responses, generation of fully-formed SIP requests from request objects (which can involve correct preparation of system headers and generation of syntactically correct SIP messages) and handling of lower-layer transport protocols such as TCP, UDP or SCTP.

In one embodiment, the container is a server software that hosts applications (i.e. contains them). In the case of a SIP container, it hosts SIP applications. The container can perform a number of SIP functions as specified by the protocol thereby taking the burden off the applications. At the same time, the SIP container can expose the application to SIP protocol messages (via the SIP Servlet API) on which applications can perform various actions. Different applications can thus be coded and deployed to the container that provides various telecommunication and multimedia services.

Figure 2:
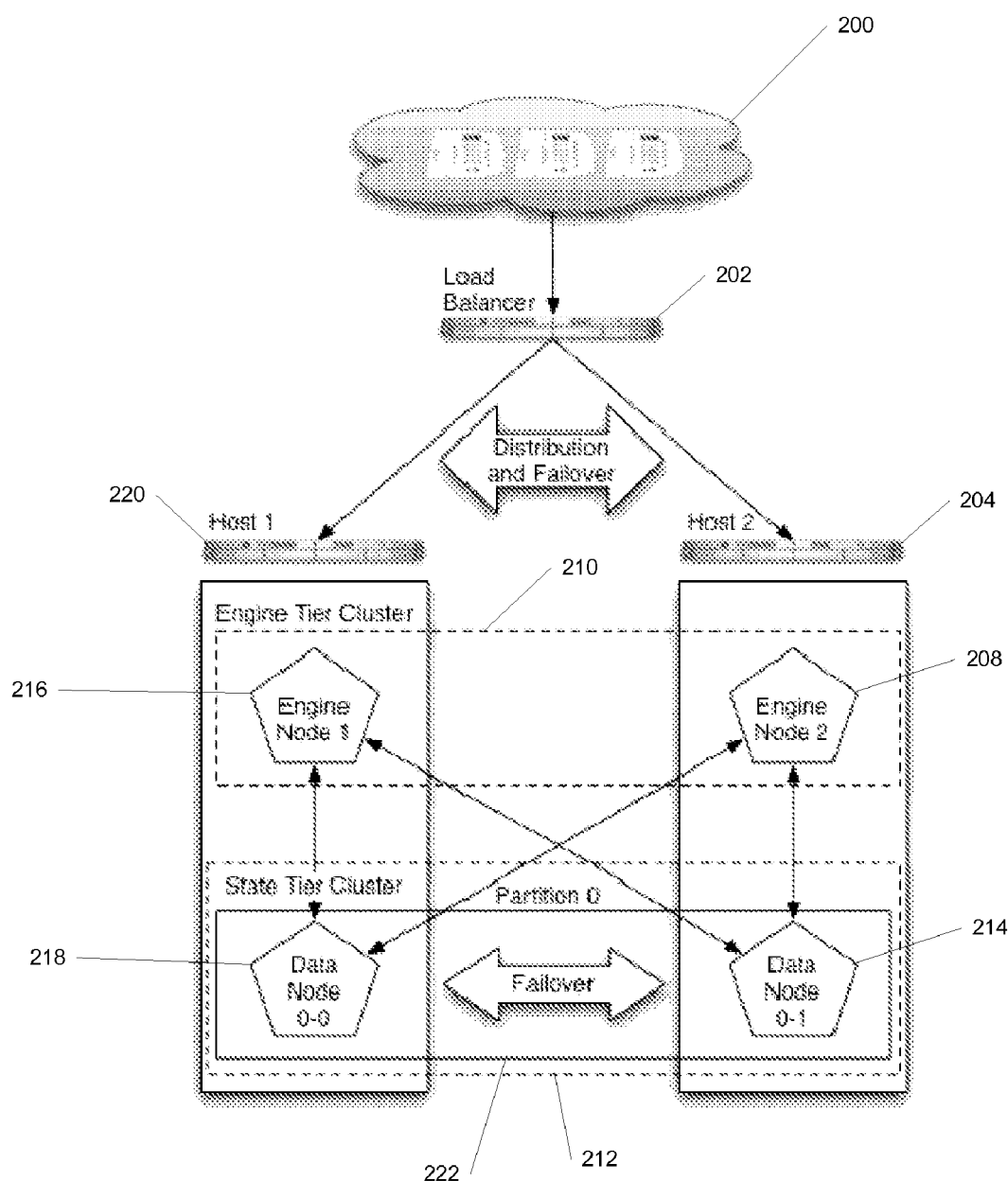
FIG. 2 is an exemplary illustration of the SIP server cluster architecture in accordance with various embodiments of the invention.

FIG. 2 is an exemplary illustration of the SIP server cluster architecture in accordance with various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means. For example, while the FIG. 2 shows Host A implementing both an engine node and a data node, this should not be construed as limiting the invention. In many cases, it can be preferable to distribute the engine node and data node onto separate host machines. Similarly, while FIG. 2 illustrates two host machines, it is possible and even advantageous to implement many more such hosts in order to take advantage of distribution, load balancing and failover that such a system can provide.

As illustrated, a message, such as a phone call request or some other transfer of data associated with SIP, can come into the cluster from the internet (such as over VoIP), phone, or some other type of network 200. This message can be received and handled by a load balancer 202 which can be responsible distributing message traffic across the engines (such as engine node 1 216 and engine node 2 208) in the cluster. The load balancer can be a standard load balancing appliance hardware device and it is not necessary that it be SIP aware; there is no requirement that the load balancer support affinity between the engines 216, 208, and SIP dialogs or transactions. However in alternative embodiments, certain advantages may be obtained by implementing a SIP-aware load balancer, as discussed in further detail below.

Alternatively, the load balancer can be implemented as software that distributes the messages to the various engines. In the various embodiments, the primary goal of the load balancer 202 can be to provide a single public address that distributes incoming SIP requests to available servers in the SIP server engine tier 210. Such distribution of requests can ensure that the SIP server engines are fully utilized. The load balancer 202 can also be used for performing maintenance activities such as upgrading individual servers or applications without disrupting existing SIP clients.

In one embodiment, the SIP server can provide a two-tier cluster architecture model to handle the incoming messages. In this model, a stateless engine tier 210 can process all signaling traffic and can also replicate transaction and session state to the state tier 212 and its partitions 222. Each partition 222 can consist of any number of nodes (replicas) 218, 214 distributed across any number of hosts such as host 1 220 and host 2 204 which can be implemented as computers linked in a cluster type network environment. The state tier 212 can be an n-way peer-replicated Random Access Memory (RAM) store that maintains various data objects which can be accessed by the engine nodes in the engine tier. In this manner, engines can be provided a dual advantage of faster access to the data objects than retrieving data from a database while at the same time, engines can be freed up from having to store the data onto the engine tier itself. This type of separation can offer various performance improvements. The state tier can also function as a lock manager where call state access follows a simple library book model, (i.e. a call state can be checked out by one SIP engine at a time).

The engine tier 210 can be implemented as a cluster of SIP server instances that hosts the SIP servlets which provide various features to SIP clients. In one embodiment, the engine tier 210 is stateless, meaning that most SIP session state information is not persisted in the engine tier, but is obtained by querying the state tier 212 which can in turn provide replication and failover services for SIP session data. In alternative embodiments, the engine tier can have state maintained in a local near cache for improving latency.

The primary goal of the engine tier 210 can be to provide maximum throughput combined with low response time to SIP clients. As the number of calls or their duration increases, more server instances can be added to the engine tier to manage the additional load. It should be noted however, that although the engine tier may include many such server instances, it can be managed as a single, logical entity. For example, the SIP servlets can be deployed uniformly to all server instances by targeting the cluster itself and the load balancer need not maintain affinity between SIP clients and individual servers in the engine tier.

In various embodiments, the state tier 212 can be implemented as a cluster of SIP server instances that provides a high-performance, highly-available, in-memory store for maintaining and retrieving session state data for SIP servlets. This session data may be required by SIP applications in the SIP server engine tier 210 in order to process incoming messages. Within the state tier 212, session data can be managed in one or more partitions 222, where each partition manages a fixed portion of the concurrent call state. For example, in a system that uses two partitions, the first partition could manage one half of the concurrent call state (e.g. A-M) and the second partition can manage the other half (e.g. N-Z). With three partitions, each can manage a third of the call state and so on. Additional partitions can be added as needed to manage large number of concurrent calls.

In one embodiment, within each partition 222, multiple servers can be added to provide redundancy and failover should the other servers in the partition fail. When multiple servers participate in the same partition 222, those servers can be referred to as replicas because each server maintains a duplicate copy of the partition's call state. For example, nodes 218 and 214 of the partition 222 can be implemented as replicas. Furthermore, to increase the capacity of the state tier 212, the data can be split evenly across a set of partitions, as previously discussed. The number of replicas in the partition can be called the replication factor, since it determines the level of redundancy and strength of failover that it provides. For example, if one node goes down or becomes disconnected from the network, any available replica can automatically provide call state data to the engine tier.

Replicas 214, 218 can join and leave the partition 222 and each replica can serve as exactly one partition at a time. Thus, in one embodiment, the total available call state storage capacity of the cluster is a summation of the capacities of each partition 222.

In one embodiment, each partition 222 can peer-replicated, meaning that clients perform all operations (reads/writes) to all replicas 218, 214 in the partition (wherein the current set of replicas in the partition is called the partition view). This can provide improved latency advantages over more traditional synchronous "primary-secondary" architecture wherein one store acts as a primary and the other nodes serve as secondaries. Latency is reduced because there is no wait for the second hop of primary-secondary systems. The peer-replicated scheme can provide better failover characteristics as well, since there does not need to be change propagation delay.

In one embodiment, the engine nodes 208, 216 can be responsible for executing the call processing. Each call can have a call state associated with it. This call state can contain various information associated with the call, such as the ids of the caller/callee, where the caller is, what application is running on the callee, any timer objects that may need to fire in order to process the call flow (as discussed below), as well as any other data that may correlate to a call or a message. The state for each call can be contained in the state tier 212. The engine tier 210, on the other hand, could be stateless in order to achieve the maximum performance. In alternative embodiments, however, the engine tier can have certain amounts of state data stored thereon at various times.

In one embodiment, a typical message processing flow can involve locking/getting the call state, processing the message and then putting/unlocking the call state. The operations supported by the replicas for normal operations can include:

lock and get call state
    put and unlock call state
    lock and get call states with expired timers In various embodiments, the engine tier can maintain mainly short lived objects and any long lived objects which may be needed for message processing can be stored on the state tier. This can provide improvements in latency during garbage collection. As an illustration, the Java Virtual Machine (JVM) garbage collector can safely and quickly remove the short lived objects from memory without interfering with the execution of various other threads which may be in the process of executing. The longer lived objects, on the other hand, are not as easily removed by the garbage collector (since they may be referenced and depended on by various entities) and thus in some cases, the JVM garbage collector may need to stop processing all threads in order to safely perform its garbage collection. This is due in part to the scoping of the short lived and long lived objects. Short lived objects typically exist in a different (more localized) memory scope than the long lived objects, which may be referenced by more entities. Thus, it can be more difficult for garbage collectors to ensure that every executing entity has finished using the long lived objects and various threads are usually stopped in order to perform their regular garbage collection. This can introduce latency.

In order to deal with such issues, the engine tier can maintain mostly short lived objects. In cases where longer lived objects are needed by the engine tier, they can be retrieved from the state tier, used as short lived objects in the engine tier, and subsequently pushed back to the state tier. This can be advantageous in that garbage collection can cause lesser interference with thread execution in the engine tier.

In various embodiments, the state tier 212 can maintain call state in various data objects residing in the random access memory (RAM) of a computer. This can provide significant access speed advantages to the engine tier 210 over the use of a database. Alternatively, if latency is not an issue, call state can be maintained in a database or some other form of persistent store, which can be accessed (albeit slower) by the engine tier. State of various applications running on the SIP server can also be maintained on the state tier. Developers can be provided an API to allow their applications to access the state tier and to store various data thereon for later access by various applications. Alternatively, application state may be stored in a database.

Diameter Protocol and Sh Support

In various embodiments, the SIP server can enable communications with a home subscriber server (HSS) by implementing the Diameter protocol and the Sh interface. The SIP server can access the HSS in order to query or update a user's data stored on the HSS or to subscribe and receive notifications when a user's data changes thereon.

An HSS server can be thought of as a database for storing information about individual users. Typically, this information includes a user profile which can be accessed via the Sh interface of the Diameter protocol. The profile can be sent over the protocol as groups of name/value pairs and it can be implemented by the SIP server in handling telecommunications with various clients and users. For example, the SIP server may treat various phone calls differently depending on the information about the user that is provided by the HSS server.

In various embodiments, the engine tier of the SIP server can have applications running thereon which handle communications as well as retrieve/provide information to and from the HSS server. The user data available to the SIP server may be defined by a service running on the SIP server or it may be a subset of the user's IMS profile data hosted on the HSS. The Sh interface can define the IMS profile data that can be queried and updated via Sh. The user data accessible via the Sh interface can be presented as an extensive markup language (XML) document.

The SIP server can implement the Diameter base protocol as a web application that is deployed to the server or run as a standalone client. Diameter can be supported over various transport protocols, such as TCP and TLS. The Sh interface can be implemented as a provider to the base Diameter web application. This provider can transparently generate and respond to Diameter command codes defined in Sh application specification. A higher level application programming interface (API) can be provided, that can enable SIP servlets to manage user profile data as an XML document using the XML Document Object Model (DOM). Furthermore, subscriptions and notifications for changed profile data can be managed by implementing a profile listener interface in a SIP servlet.

Figure 3A:
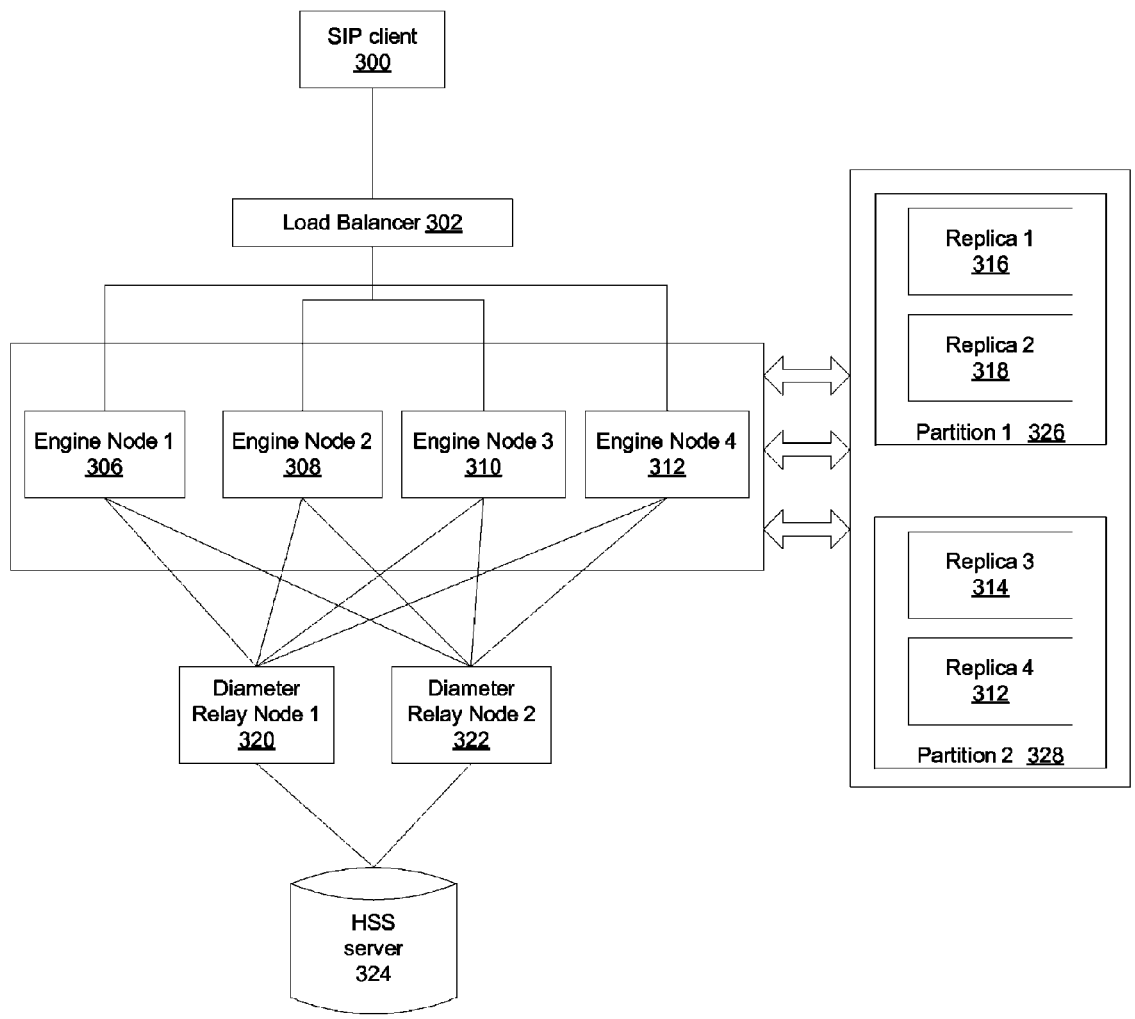
FIG. 3A is an exemplary illustration of the cluster network with diameter relays, in accordance with various embodiments of the invention.

FIG. 3A is an exemplary illustration of the cluster network with diameter relays, in accordance with various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, a load balancer 302 can be the SIP client 300 entry way to the cluster network implementing the SIP server. As previously discussed, the load balancer can distribute traffic to the engine nodes 306, 308, 310, 312 in the engine tier which can query the state tier replicas 312, 314, 316, 318 in various partitions 326, 328 for state needed to process the traffic.

The HSS server 324 can often be a most connected to element in the IMS network. As such, many carriers find the scalability of the HSS to be important and too many connections undesirable. The SIP server architecture can provide for Diameter relay nodes 320, 322 in order to limit the number of open connections to the HSS. The redundant instances of the relay node can also provide for fault tolerance in case one fails. The Diameter relay nodes can maintain a sticky connection for responses to the various engines and can be a simple relay node (e.g. need not write any headers, but simply allow messages to pass through).

In various embodiments, the engine tier can implement a high number of engine nodes which may need access to the HSS server. Rather than creating an open connection on the HSS for every engine node, relays can be provided which can allow requests and responses to pass through to and from the HSS. In this manner, the number of direct connections to the HSS server can be reduced to a smaller number (e.g. 1 or 2).

The Diameter can also be able to map diameter responses back to the appropriate context. For example, the Diameter implementation can keep state associated by using a triplet of user referenced, application session and data referenced parameters.

In various embodiments, the Diameter web application can be deployed on the engine tier cluster to each engine node, as previously discussed. The web application can be started before all the other web applications and SIP servlets deployed to the cluster. Further, the SIP server can provide an API for querying and modifying subscriber profile data or to manage subscriptions for receiving notifications about changed profile data. There can be two approaches for managing profile data. One approach can manage profile data by the application. Using this approach, the SIP servlet can explicitly request user profile documents and nodes using the Sh provider application. The provider can return a local document set which can then be read or modified by the servlet using standard DOM techniques. The updates to the local documents can be applied to the HSS after a commit operation, or immediately after modifying the data. Under another approach, the SIP server container can maintain a document set for all SIP servlets that are registered to process a given SIP message. Servlets can specify the required user profile data as the value in a parameter of the deployment descriptor and the container can then ensure that data is available to servlet methods as they are executed. The container can also automatically apply updates to the document set data whenever it writes the associated call state to the state tier.

Servlets that use application managed profile data can explicitly obtain a document set from a factory and then use the document set like a map collection object. Document sets can be retrieved by specifying a key that selects both the Sh XML document and one or more XML nodes. For example, the document selector and the node selector can be separated by a specified character(s).

In one embodiment, the document selector string identifies the XML document to be retrieved by a Diameter interface. The first portion of the selector can identify the Diameter interface provider to use for retrieving the document. The next element can be a URI that corresponds to the User-Identity or Public-Identity of the user whose profile is being retrieved. The following element can specify the data reference type being requested. Other requests can use an access key, specified by another element. More such elements can also be provided.

The node selector can define the nodes of the Sh document that is retrieved. For example, the repository data reference can return an XML document with a schema defined by a specific application. The node selector you specify can conform to the same schema.

In various embodiments, the SIP server can further provide a helper class to easily retrieve a profile document. For example, the getDocument method of the helper class can take a constructed document set key and an existing application session object and return a read-only version of the document. In order to modify the document, a copy can be made and edited and sent along with the document set key as arguments to the putDocument method.

In various embodiments, with container-managed profile data, the SIP server can make a document set available to application methods as they are executed. Thus, instead of constructing an explicit document set key, a user data specification can be created as a parameter in the application deployment descriptor. This user data specification can indicate the SIP methods in which the profile data is needed and can also define the Sh data reference document and nodes of interest to the method. The SIP servlet container can substitute portions of the user data specification with data matching the user associated with the call being processed. The container can then retrieve the nodes identified in the user data specification and make them available to the servlet method when it is executed. The servlet method can access the user profile data by accessing the request attribute name assigned to the user data specification. Any updates to the profile data can be transmitted to the HSS when the call state data associated with the SIP dialog is written to the state tier.

Figure 3B:
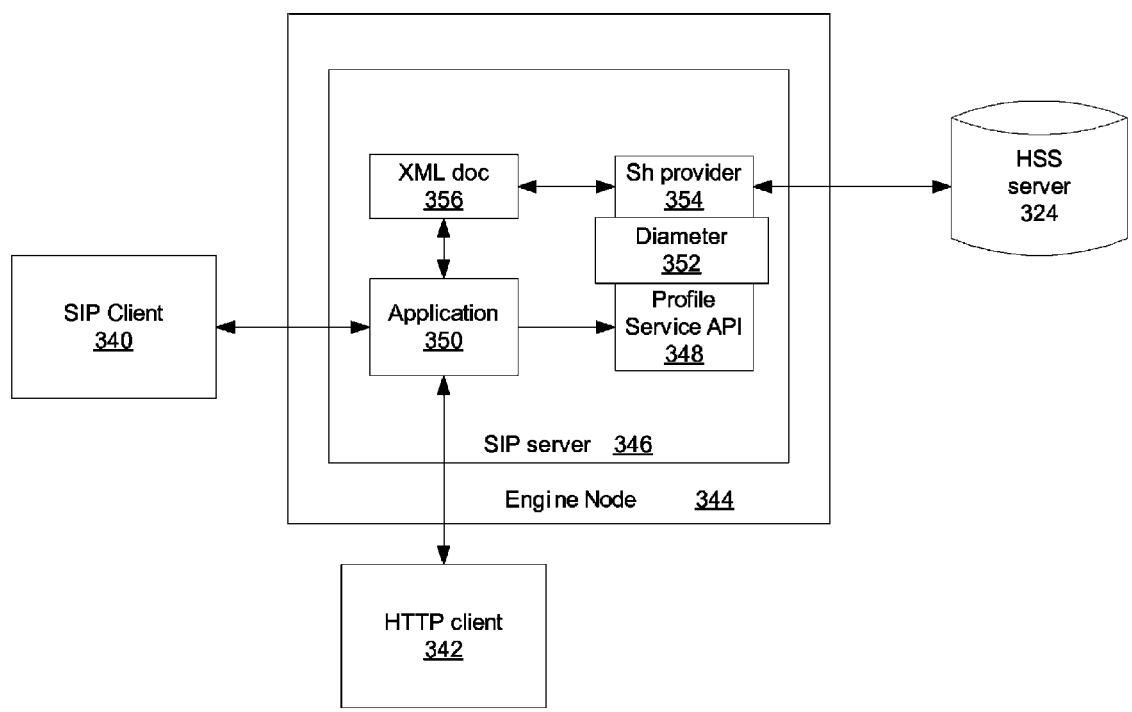
FIG. 3B is an exemplary illustration of the Diameter and Sh support for an SIP server, in accordance with various embodiments of the invention.

FIG. 3B is an exemplary illustration of the Diameter and Sh support for an SIP server, in accordance with various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, a generic profile service API 348 can be implemented by the SIP server 346 running on an engine node 344 in order to allow an application 350 to access the HSS server 324. In some embodiments, the application can be a converged application, able to handle communications from SIP clients 340 as well as HTTP clients 342. The profile service API can thus enable the application to obtain information associated with individual users from the HSS server. For example, the application 350 can query or update a user's data stored on the HSS via the use of the profile service. Similarly, the application can subscribe to and receive notifications when a user's data changes on the HSS. The Diameter base protocol 352 can be implemented as a web application deployed on the engine tier cluster. It can use a load order value of one in order to ensure that it starts before all other web applications and SIP servlets. The Sh interface can be implemented as a provider 354 to the base Diameter web application 352. This provider can transparently generate and respond to the Diameter command codes which defined in the Sh application specification. The user profile data can be provided to the SIP servlets as an XML document 356. Under the application managed approach discussed above, the SIP servlet can explicitly request user profile documents 356 and can then use standard DOM techniques for reading and modifying the profile data in the local document set. The updates can be applied to the HSS server 324 after a commit operation or immediately after modifying the data. Under the container managed approach, on the other hand, the SIP server container can automatically maintain a document set 356 for all SIP servlets that are registered to process a given SIP message. The container can then apply the updates to the document set 356 when it writes the associated call state to the state tier, as previously described. Subscriptions and notifications for changed profile data can be managed by implementing a profile listener interface in a SIP servlet.

In this manner, the generic profile service API provides a simple and improved way for the SIP server to access data associated with various users. In various embodiments, a multitude of methods can be defined for accessing the documents from the HSS server via the profile service. The following is an exemplary illustration of the various methods that can be implemented:

| Return Type | Method | Summary |
| --- | --- | --- |
| org.w3c.dom.Document | getDocument(java.lang.String docSel) | Get a document |
| Void | PutDocument(java.lang.String docSel, org.w3c.dom.Document doc) | Update a document |
| ProfileSubscription | subscribe(SipApplication session, java.lang.String docSel, java.io.Serializable info) | Subscribe to change notifications for a document described by the docSel document selector |

-continued

| Return Type | Method | Summary |
|---|---|---|
| Interface ProfileSubscription | | |
| void | cancel( ) | Cancel this subscription |
| SipApplicationSession | GetApplicationSession( ) | The application session that was used to register |
| Java.lang.String | GetDocumentSelector( ) | The document selector that was used to register |
| Java.io.Serializable | getInfo( ) | The information that was used when registering |
| Interface ProfileListener | | |
| void | update(ProfileSubscription ps, org.w3c.dom.Document doc) | Invoked when a change happens to a document to which a subscription has been made using ProfileService.subscribe(javax.servlet.sip.SipApplicationSession String, java.io.Serializable) |

Figure 4:
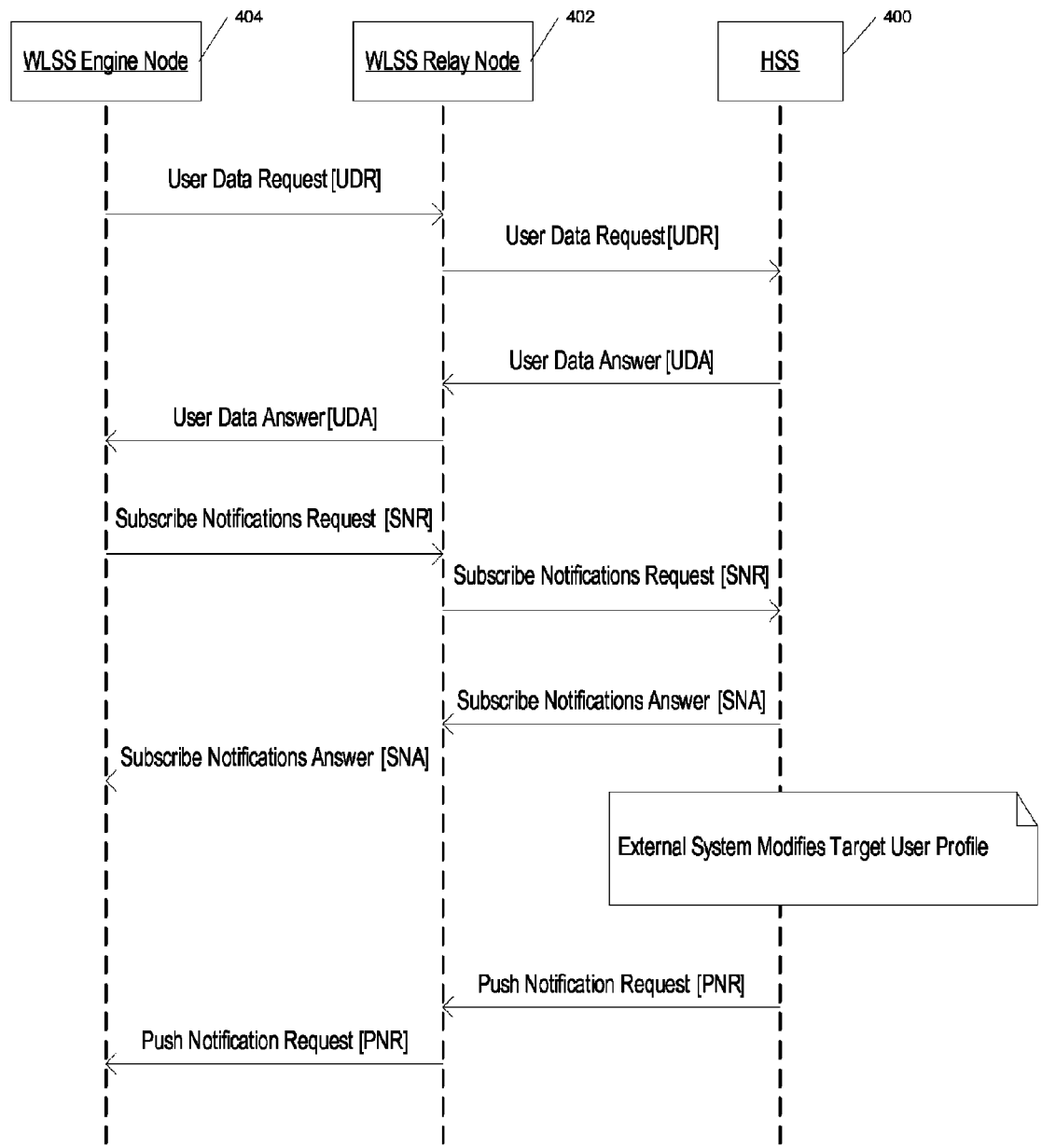
FIG. 4 is an exemplary flow diagram of the SIP server with Diameter and Sh support, in accordance with various embodiments.

FIG. 4 is an exemplary flow diagram of the SIP server with Diameter and Sh support, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated, the engine node 404 can send various requests to and receive appropriate responses from the HSS server 400 by way of the SIP server relay node 402. The vertical lines extending from the engine node, relay node and HSS illustrate that time is flowing downwards as communications are sent back and forth. For example, the engine node 404 can initiate a user data request (UDR) to the relay node 402 which can in turn forward the request to the HSS server 400. The HSS server can then respond by sending an appropriate user data answer (UDA) to the relay node which can forward this answer back to the requesting engine node.

Continuing with the illustration, once the engine node 404 has received the appropriate user data, it can choose to subscribe to receive notifications from the HSS server 400. It can initiate this subscription process by sending a subscribe notifications request (SNR) to the relay node 402 which can forward the request to the HSS. The HSS server can respond with a subscribe notifications answer to the relay node, which can be forwarded back to the relay node. The SNA can inform the engine node whether the subscription request was successful and whether the engine node is now able to receive notifications.

As illustrated, various systems which are external to this diagram can modify the target user profile after the engine node has subscribed, as previously discussed. Whenever such modifications to data occur, the HSS can send a push notification request (PNR) to the relay node which can relay that information to the engine node. As such, the engine node can be notified that the user profile has been updated and can take appropriate action, such as requesting the updated user profile.

In various embodiments, communications such as UDR, UDA, SNR, SNA and PNR can be defined Sh Diameter commands for accessing user profile data on the HSS server. For example, the user data request is a request from an application server to an HSS server requesting the profile data associate with a particular user. The following are nonlimiting examples of various requests and responses which may be communicated between the engine node and the HSS server:

User Data Request

```
<User-Data-Request Flags="RP" AppId="16777217"
HopByHopId="1988096665" EndToEndId="1492124313">
    <Session-Id>64.81.57.26;1144207323;0</Session-Id>
    <Origin-Host>64.81.57.26</Origin-Host>
    <Origin-Realm>bea.com</Origin-Realm>
    <Origin-State-Id>1144207323</Origin-State-Id>
    <Vendor-Specific-Application-Id>
        <Vendor-Id>10415</Vendor-Id>
        <Auth-Application-Id>16777217</Auth-Application-Id>
    </Vendor-Specific-Application-Id>
    <Destination-Realm>nbn.cpqcorp.net</Destination-Realm>
    <Destination-Host>nbnhp11.nbn.cpqcorp.net</Destination-Host>
    <Auth-Session-State>1</Auth-Session-State>
    <User-Identity>
        <Public-Identity>sip:beauser1@bea.com</Public-Identity>
    </User-Identity>
    <Data-Reference>0</Data-Reference>
    <Service-Indication>BlahBlah</Service-Indication>
</User-Data-Request>
```

User Data Answer

```
<User-Data-Answer Flags="P" AppId="16777217"
HopByHopId="1988096665" EndToEndId="1492124313">
    <Session-Id>64.81.57.26;1144207323;0</Session-Id>
    <Origin-Host>nbnhp11.nbn.cpqcorp.net</Origin-Host>
    <Origin-Realm>nbn.cpqcorp.net</Origin-Realm>
    <Vendor-Specific-Application-Id>
        <Vendor-Id>10415</Vendor-Id>
        <Auth-Application-Id>16777217</Auth-Application-Id>
    </Vendor-Specific-Application-Id>
    <Auth-Session-State>1</Auth-Session-State>
```

-continued

User Data Answer

```
<Result-Code>2001</Result-Code>
<User-Data/>
   <![CDATA[0c0f080d0c0006050203090f0e0d02010e000200050e030f04090e070d020504060
d08020f0e0a0c03080d040104010e0c0205000f0309040f0209040104010e0c03050206090305090
e0409030104090f0e0e020c0108020c01080c0f03050206090305090e0409030104090f0e0e0a0c0
3050105050e03050e050d0205020e000c0f03050105050e03050e050d0205020e0a0c03050206090
305040104010e0a0c060f0f0e08050c0c0f0c00070f020c040c0f060f0f0e0c0f030502060903050
40104010e0a0c0f0205000f0309040f0209040104010e0a0c0f03080d040104010e0a]]>
   </User-Data>
</User-Data-Answer>
```

Profile Update Request

```
<?xml version="1.0" encoding="UTF-8"?>
<Sh-Data>
   <RepositoryData>
      <ServiceIndication>BlahBlah</ServiceIndication>
      <SequenceNumber>0</SequenceNumber>
      <ServiceData>
         <Foo>Hello, world/Foo>
      </ServiceData>
   </RepositoryData>
</Sh-Data>
<?xml version="1.0" encoding="UTF-8"?>
<Sh-Data>
   <RepositoryData>
      <ServiceIndication>BlahBlah</ServiceIndication>
      <SequenceNumber>1</SequenceNumber>
      <ServiceData>
         <Foo>Hello, world</Foo>
      </ServiceData>
   </RepositoryData>
</Sh-Data>
```

As an illustration, a sample servlet which can use the profile service to retrieve and write user profile data is shown below:

```
package demo;
   import com.bea.wcp.profile.*;
   import javax.servlet.sip.SipServletRequest;
   import javax.servlet.sip.SipServlet;
   import org.w3c.dom.Document;
   import java.io.IOException;
   public class MyServlet extends SipServlet{
      private ProfileService psvc;
      public void init( ) {
         psvc=(ProfileService)
getServletContext( ).getAttribute(ProfileService.PROFILE_SERVICE);
      }
      protected void doInvite(SipServletRequest req) throws IOException {
         String docSel = "sh://" + req.getTo( ) + "/IMSUserState/";
         //Obtain and change a profile document
         Document doc = psvc.getDocument(docSel); //doc may be
         read only
         Document docCopy = (Document) doc.cloneNode(true);
         //modify the copy using DOM.
         Psvc.putDocument(docSel, docCopy); // apply the changes
```

Call Flow

In various embodiment, the engine tier can also have applications deployed thereon which handle various call flows in the form of SIP communications between the SIP server and clients. For example, whenever a user initiates an SIP conversation to the SIP server, an application can make appropriate responses, which can include obtaining user profile data as discussed above. An example of a SIP communication call flow is illustrated below.

Figure 5:
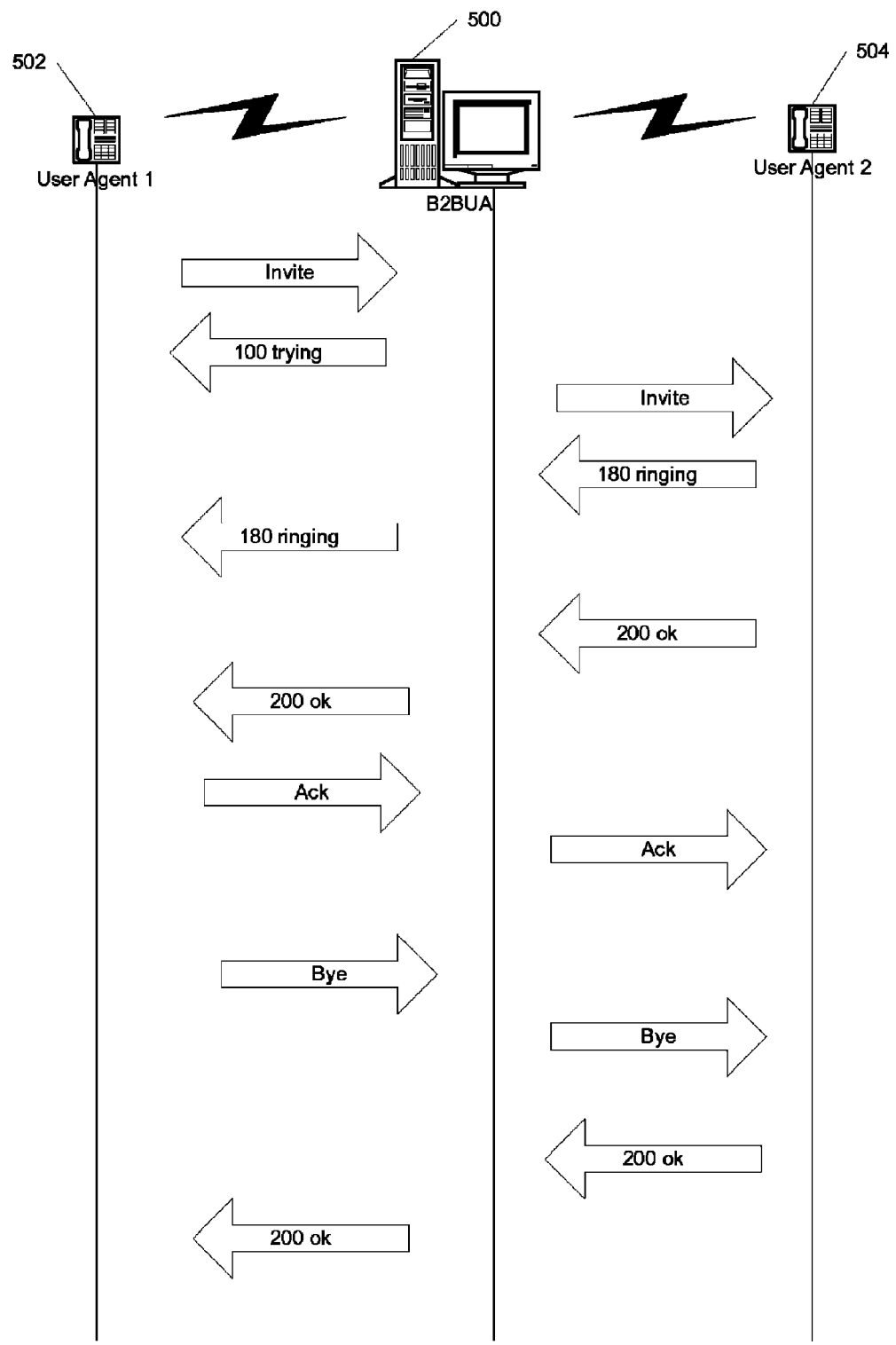
FIG. 5 is an exemplary illustration of a call flow in a typical SIP communication session, in accordance with various embodiments.

FIG. 5 is an exemplary illustration of a simplified call flow in a typical SIP communication session, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated, a back to back user agent (B2BUA) 500, having an running SIP server thereon can take the place of being an intermediary between the communications sent between various users. This can be done for purposes of controlling the call and message flow between user agent 1 502 and user agent 2 504 and in order to prevent any unwanted behavior and messages (e.g. spamming, hacking, viruses, etc.) from being sent to the user agent device. It should be noted that although user agent 1 502 and user agent 2 504 are illustrated as telephones in FIG. 5, the SIP messages can come from various other sources as well. For example, the user agent can also be a cell phone, a wireless device, a laptop, an application or any other component that can initiate a SIP type of communication. Similarly, while FIG. 5 illustrates communications between two user agents (502, 504), there can be more such user agents taking part of a single communication session. For example, during a conference call, there may be 20 or 30 user agents for all attendees of the conference, each of which could send SIP messages to the B2BUA 500 and receive transmissions back therefrom.

Continuing with the illustration, a telephone call can be set up between user agent 1 502 and user agent 2 504 via the use of the SIP server. The first message sent from user agent 1 502 to the SIP server on the B2BUA 500 can be an invite message, requesting to set up a telephone call with user agent 2 504. The invite message can be received by the load balancer 202 of the SIP server and it can be directed to an engine in the engine tier 210 for processing.

In various embodiments, the engine tier (e.g. an application executing thereon) can then perform logic for determining various factors associated with the call, such as determining whether user agent 1 502 is allowed to make the type of call attempted to be initiated, determining whether the callee that will be contacted is properly identified, as well as any other logic that the server may need to calculate before attempting to set up a telephone call. This information can be obtained by querying the HSS server for user profile data, in the manner discussed above. The engine can then generate state around the fact that a call is being set up, including generating the proper long lived and short lived objects associated with the messages. The engine can also determine how to find the target of the call (i.e. user agent 2 504) and the right path to route the message to the callee. As illustrated herein, user agent 1 is an originator (as well as the terminator) of the call and user agent 2 is referred to as the callee.

After receiving the invite message, the SIP server can send a "100 trying" message back to user agent 1 502, indicating that it has received the invite message and that it is in the process of handling it. The "100 trying" message is part of the SIP protocol definition and can be used by a server in order to stop the user agent from re-transmitting the invite request. In cellular phone environments, the user agent may have interference which might cause an interruption or loss of various messages. Therefore SIP protocol defines various re-transmission schemes in order to handle such mobility and interruptions. Messages such as "100 trying," "180 ringing," and "200 OK" are just some of the examples of messages defined in SIP for handling communication.

Continuing with the illustration, the SIP server can then send an invite message to the user agent 2 504 and can receive back a "180 ringing" message, indicating that user agent 2 504 has received the invitation and is now waiting for a user to answer. The SIP server engine tier can then transmit the "180 ringing" message back to user agent 1 502. When a person finally answers the phone, user agent 2 504 can then send a "200 ok" message to the SIP server, the server can transmit that message to user agent 1 502. The user agent 1 502 can send an acknowledgement ("Ack" message) to the SIP server which can be transmitted along to user agent 2 504 and at this point a sound transfer conversation can be set up between the two user agents. This sound transfer can be implemented via real transfer protocol (RTP) on a media server. At the end of the conversation, either user agent can choose to terminate the call by sending a "Bye" message. In this illustration, user agent 1 502 terminates the call by sending a "Bye" message to the SIP server which sends it off to user agent 2 504. After receiving back a "200 ok" message from user agent 2, the SIP server can transmit that message to user agent 1 and the conversation can be truly ended.

In various embodiments, the vertical lines such as those extending downward from the user agents 502, 504 and the B2BUA 500 can each illustrate and be referred to as a single call leg. The call flow for each call leg may be time sensitive as some messages should be received or sent before others can be initiated. For example, as illustrated herein, the user agent A 502 may continue to re-transmit the initial invite message until it receives a "100 trying" message from the B2BUA 500. As such, in some cases certain messages may need to be processed synchronously while others may be allowed to process in parallel.

It should be noted that this illustration of a call may be overly simplified for purposes of clarity. For example, there can be various other message transmissions (not illustrated) such as authentication messages for caller/callee, determining the type of user agent the SIP server is communicating with and various other handshaking messages that can be exchanged between the SIP server and the user agents. Furthermore, message transmitting steps may be added, changed, interrupted or rearranged in case of interference or failure of various components.

Timer Objects

As previously discussed, in various embodiments there may be specific sequences of messages exchanged between the SIP server and the user agents for controlling the flow of the call. These sequences can be controlled by various timer objects residing on the SIP server. As a nonlimiting illustration, after receiving the invite message from one user agent, the SIP server will typically forward that invite to another user agent and wait for a response. If no response is received within a period of time (e.g. a number of milliseconds), then the invite message may need to be retransmitted to the second user agent because it may be assumed that the user agent did not receive the first message. This type of re-transmission can be controlled by the protocol timer objects which may be residing in the state tier. In one embodiment, an initial Ti timer value of 500 milliseconds can control the retransmission interval for the invite request and responses and can also set the value of various other timers.

In various embodiments, there are also other timer objects which can be executing on the level of the entire call. For example, if after a specified period of time, nothing is heard back from either user agent, the entire call may be purged from the system. This specified period of time can also be controlled by firing a timer object.

In one embodiment, as engine tier servers add new call state data to the state tier, state tier instances queue and maintain a complete list of SIP protocol timers and application timers associated with each call. Engine tier servers can periodically poll the partitions of the state tier to determine which timers have expired given the current time. In order to avoid contention on the timer tables, multiple engine tier polls to the state tier can be staggered. The engine tier can then process the expired timers using threads in the sip.timer.Default execute queue. Thus, the processing of the timer objects can be executed by the engine server as determined by the state tier server. For example, the state tier can tell the engine A to execute the first half of all due timer objects (e.g. 1-100) and tell engine B to execute the other half (e.g. 101-200). The state tier can also simultaneously push the state onto the engine, since the state may need to be employed in executing the timer objects. The engines can then process the timer objects (e.g. by sending appropriate messages, ending appropriate calls) and can later again query poll the state tier for which timers have become due.

When used with the near cache, the state data may not need to be pushed onto the engine server since that data may already be available in the cache. Thus, when processing timers, the timers can be fetched from the state tier, however upon the timer firing, the engine can fetch the call state using the cache. Further performance optimization can be obtained by changing the selection of tiers to give affinity to the engine holding the cache for a particular call. Thus, the timers which are going to be executed can be sent to the appropriate engines which have the proper call state in the cache thereon.

In various embodiments, it may be preferable to synchronize system server clocks to a common time source (e.g. within a few milliseconds) in order achieve maximum performance. For example, an engine tier server with a system clock that is significantly faster than other servers may process more expired timers than the other engine tier servers. In some situations this may cause retransmits to begin before their allotted time and thus care may need to be taken to ensure against it.

In various embodiments, the SIP Servlet API can provide a timer service to be used by applications. There can be TimerService interface which can be retrieved from as a ServletContext attribute. The TimerService can define a "createTimer(SipApplicationSession appSession, long delay, boolean isPersistent, java.io.Serializable info)" method to start an application level timer. The SipApplicationSession can be implicitly associated with the timer. When a timer fires, an application defined TimerListener is invoked and ServletTimer object passed up, through which the SipApplicationSession can be retrieved which provides the right context of the timer expiry.

Failover

In various embodiments, the engine tier servers continually access the state tier replicas in order to retrieve and write call state data. In addition, the engine tier nodes can also detect when a state tier server has failed or become disconnected. For example, in one embodiment, when an engine cannot access or write call state data for some reason (e.g. the state tier node has failed or become disconnected) then the engine can connect to another replica in the partition and retrieve or write data to that replica. The engine can also report that failed replica as being offline. This can be achieved by updating the view of the partition and data tier such that other engines can also be notified about the offline state tier server as they access state data.

Additional failover can also be provided by use of an echo server running on the same machine as the state tier server. The engines can periodically send heartbeat messages to the echo server, which can continually send responses to each heartbeat request. If the echo server fails to respond for a specified period of time, the engines can assume that the state tier server has become disabled and report that state server as previously described. In this manner, even quicker failover detection is provided, since the engines can notice failed servers without waiting for the time that access is needed and without relying on the TCP protocol's retransmission timers to diagnose a disconnection.

Failover can also be provided for the engine tier nodes. As previously discussed, the engine tier nodes can periodically poll the state tier nodes in order to determine which timer objects it needs to execute. In turn, the state tier nodes can notice whenever the engine tier node has failed to poll. If a specified period of time elapses and the engine tier has not polled the state tier, the state server can then report that engine as unavailable (e.g. having failed or disconnected from the network). In this manner, failover can be implemented for both the state tier and the engine tier, thereby providing a more reliable and secure cluster for message processing.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing systems and methods for providing the SIP server architecture as discussed herein.

Various embodiments may be implemented using a conventional general purpose or specialized digital computer(s) and/or processor(s) programmed according to the teachings of the present disclosure, as can be apparent to those skilled in the computer art. Appropriate software coding can readily be prepared by skilled programmers based on the teachings of the present disclosure, as can be apparent to those skilled in the software art. The invention may also be implemented by the preparation of integrated circuits and/or by interconnecting an appropriate network of conventional component circuits, as can be readily apparent to those skilled in the art.

Embodiments can provide, by way of example and without limitation, services such as:

VoIP services, including, without limitation the following features:
  Basic features. These include standards services such as Voice mail, Caller ID, Call waiting, and call forwarding (the ability to forward a call to a different number).
  Advanced features. Following is a brief list of advanced features:
  Call logs: The ability to view calls made over a given period of time online, ability to associate names with phone numbers, integrate call log information to other applications such as IM.
  Do not disturb: The ability to specify policies around receiving calls - for example, all calls during office hours to be automatically forwarded to a mobile terminal, all calls during the night to be directed to voice mail etc.
  Locate me: This is advanced call forwarding. Rather than have all calls forwarded to a single location (e.g., voice mail) when the caller is busy, Locate me can try multiple terminals in series or in parallel. For example, a user may have two office locations, a mobile, and a pager, and it may make sense to forward a call to both office locations first, then the pager, and then the mobile terminal. Locate me is another example of feature interaction.
  Personal conferencing: A user could use an existing application (e.g., IM client) to schedule a Web/audio conference to start at a certain time. Since the IM client already has personal profile information, the conferencing system sends out the Web conference link information either through IM and/or email to the participants. The phone contact information in the profile is used to automatically ring the participants at the time of the conference.
  Lifetime number: This is the facility where a single virtual number can travel with a customer wherever they live. Even if they move, the old number continues to work, and reaches them at their new location. This is really the analog of static IP addresses in a phone network.
  Speed dial: This is the ability to dramatically expand the list of numbers that can be dialed through short-key and accelerator combinations. This is another example of a converged application, since it's very likely that when a user will set up this information when they work through the call logs on the operator user portal, and the updated information needs to be propagated to the network side in real-time.

Media delivery services, including, without limitation the following features:
  Depending on the service level agreement users are willing to sign up to, the quality of media delivered (e.g. number of frames per second) will vary. The policy engine enables segmenting the customer base by revenue potential, and to maximize return on investment made in the network.

Context-sensitive applications including, without limitation the following features:

A typical example here is the need for applications that have a short lifetime, extremely high usage peaks within their lifetime, and immediacy. For example, voting on American Idol during the show or immediately afterwards has proved to be an extremely popular application.

Integrated applications including, without limitation the following features:

The final class of applications is one that combines wireline and wireless terminal usage scenarios. An example of an integrated application is the following: a mobile terminal user is on a conference call on their way to work. When he reaches his office, he enters a special key sequence to transfer the phone call to his office phone. The transfer happens automatically without the user having to dial in the dial-in information again. It's important to note hear that this capability be available without the use of any specific support from the hand-set (a transfer button for example).

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A telecommunications system, comprising:
a session initiation protocol (SIP) server distributed over a cluster network and having a Diameter protocol web application deployed thereon for handling SIP communications with a client, wherein the SIP server further includes
an interface provider that generates and responds to a set of Diameter command codes;
a plurality of state replica nodes that store state information associated with said SIP communications;
a plurality of stateless engine nodes that process said SIP communications received from the client, wherein each stateless engine node receives a SIP communication from the client, retrieves said state information from at least one of the plurality of state replica nodes, processes said SIP communication using the state information, and writes changes to the state information to the at least one of the plurality of state replica nodes; and
at least one relay node that establishes a connection to a home subscriber server (HSS) that stores user profile data about the client, wherein each of the plurality of stateless engine nodes sends requests for said user profile data to the HSS over the at least one relay node and receives responses from the HSS over the at least one relay node without maintaining any direct connections to the HSS; and
a profile service on the SIP server that allows the Diameter protocol web application to query and update the user profile data, and to subscribe and receive notifications when the user profile data changes, wherein updating the user profile data includes
receiving the set of Diameter command codes at the interface provider to request a document set containing the user profile data by specifying a key that selects the document set,
providing the document set to the plurality of stateless engine nodes, and
communicating the document set containing the user profile data to methods of said Diameter protocol web application as said methods are executed, wherein as said methods are executed, updates to the document set are applied as the plurality of engine nodes write changes to the state replica nodes.

2. The system of claim 1, further comprising:
a Diameter protocol web application deployed on the SIP server for enabling Diameter protocol message types to be exchanged between the SIP server and the HSS.

3. The system of claim 2, further comprising:
an Sh interface provider deployed on the SIP server, wherein the Sh interface provider transparently generates and responds to a set of Diameter command codes of the Diameter protocol.

4. The system of claim 3, further comprising:
an application programming interface (API) that allows SIP servlets to manage the user profile data as an extensive markup language document.

5. The system of claim 1, further comprising:
an extensive markup language (XML) document that maintains user profile data and allows the Diameter protocol web application to manage the user profile data using standard document object model (DOM) methods.

6. The system of claim 1, wherein the Diameter protocol web application manages the user profile data by explicitly requesting user profile documents from the profile service.

7. The system of claim 1, wherein a SIP server container of the SIP server manages the user profile data by maintaining a document set for all SIP servlets that are registered to process a specific SIP message.

8. A computer implemented method, comprising:
maintaining a plurality of stateless engine nodes executing on computing devices connected to a cluster network, said plurality of stateless engine nodes having a Diameter protocol web application deployed on at least one of said plurality of stateless engine nodes for processing SIP communications with a client;
providing an interface provider that generates and responds to a set of Diameter command codes;
maintaining a plurality of state replica nodes that store state information associated with said SIP communications, wherein each stateless engine node receives a SIP communication from the client, retrieves said state information from at least one of the plurality of state replica nodes, processes said SIP communication using the state information, and writes changes to the at least one state information to the state replica node;
maintaining a connection to a home subscriber server (HSS) that stores user profile data associated with the client;
maintaining a relay node coupled to the cluster network, wherein the relay node establishes the connection with the HSS, and wherein each of the plurality of stateless engine nodes sends requests for said user profile data to the HSS over the relay node and receives responses from the HSS over the relay node without maintaining any direct connections to the HSS; and
providing a profile service on the SIP server that allows the Diameter protocol web application to query and update the user profile data on the HSS, and to subscribe and receive notifications when the user profile data changes on the HSS, wherein updating the user profile data includes
receiving the set of Diameter command codes at the interface provider to request a document set containing the user profile data by specifying a key that selects the document set,
providing the document set to the plurality of stateless engine nodes, and
communicating the document set containing the user profile data to methods of said Diameter protocol web application as said methods are executed, wherein updates to the document set are applied as the engine nodes write changes to the state replica nodes.

9. The method of claim 8, further comprising:
transmitting a request for subscribing to notifications about changes to the user profile data stored on the HSS, wherein the request is transmitted to the HSS server via the relay node.

10. The method of claim 9, further comprising:
modifying the user profile data on the HSS by an external entity; and
transmitting a notification by the HSS server to the engine node via the relay node.

11. The method of claim 8, further comprising:
providing a Diameter protocol web application for allowing Diameter protocol messages to be exchanged between a particular engine node and the HSS server.

12. The method of claim 11, further comprising:
providing a Sh interface provider deployed on the particular engine node wherein the Sh interface provider transparently generates and responds to the Diameter command codes.

13. The method of claim 8, further comprising:
providing an application programming interface (API) that allows SIP servlets to manage the user profile data as an extensive markup language document.

14. The method of claim 8, further comprising:
providing an extensive markup language (XML) document that maintains user profile data and allows the application to manage the user profile data using standard document object model (DOM) methods.

15. The method of claim 12, wherein the Diameter protocol web application manages the user profile data by explicitly requesting user profile documents from a Sh provider application.

16. The method of claim 8, wherein a SIP server container manages the user profile data by maintaining a document set for all SIP servlets that are registered to process a specific SIP message.

17. A non-transitory computer readable storage medium having instructions stored thereon which when executed by one or more processors cause the one or more processors to:
maintain a plurality of stateless engine nodes executing on computing devices connected to a cluster network, said plurality of stateless engine nodes having a Diameter protocol web application deployed on at least one of said plurality of stateless engine nodes for processing SIP communications with a client;
provide an interface provider that generates and responds to a set of Diameter command codes;
maintain a plurality of state replica nodes that store state information associated with said SIP communications, wherein each stateless engine node receives a SIP communication from the client, retrieves said state information from at least one of the plurality of state replica nodes, processes said SIP communication using the state information, and writes changes to the at least one state information to the state replica node;
maintain a connection to a home subscriber server (HSS) that stores user profile data associated with the client;
maintain a relay node coupled to the cluster network, wherein the relay node establishes the connection with the HSS, and wherein each of the plurality of stateless engine nodes sends requests for said user profile data to the HSS over the relay node and receives responses from the HSS over the relay node without maintaining any direct connections to the HSS; and
provide a profile service on the SIP server that allows the Diameter protocol web application to query and update the user profile data on the HSS, and to subscribe and receive notifications when the user profile data changes on the HSS, wherein updating the user profile data includes
receiving the set of Diameter command codes at the interface provider to request a document set containing the user profile data by specifying a key that selects the document set,
providing the document set to the plurality of stateless engine nodes, and
communicating the document set containing the user profile data to methods of said Diameter protocol web application as said methods are executed, wherein updates to the document set are applied as the engine nodes write changes to the state replica nodes.

* * * * *

UNITED STATES PATENT AND TRADEMARK OFFICE
CERTIFICATE OF CORRECTION

PATENT NO.       : 8,219,697 B2
APPLICATION NO.  : 11/750261
DATED            : July 10, 2012
INVENTOR(S)      : Langen et al.

It is certified that error appears in the above-identified patent and that said Letters Patent is hereby corrected as shown below:

On page 3, in column 1, under "Other Publications", line 6, delete "productsfiain" and insert -- products/jain --, therefor.

On page 3, in column 1, under "Other Publications", line 19, delete "Configuaring" and insert -- Configuring --, therefor.

On page 3, in column 2, under "Other Publications", line 10, delete "2003," and insert -- 2008, --, therefor.

On page 3, in column 2, under "Other Publications", line 20, delete "Ssystem" and insert -- System --, therefor.

In column 1, line 4, before "CLAIM OF PRIORITY" insert

-- COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. --.

In column 1, line 42, delete "TELEOMMUNICATIONS" and insert -- TELECOMMUNICATIONS --, therefor.

In column 2, line 5, delete "sh" and insert -- Sh --, therefor.

In column 6, line 13, delete "thereby can" and insert -- thereby --, therefor.

Signed and Sealed this
Second Day of October, 2012

David J. Kappos
*Director of the United States Patent and Trademark Office*

CERTIFICATE OF CORRECTION (continued)
U.S. Pat. No. 8,219,697 B2

In column 15, line 22, delete "world/Foo>" and insert -- world</Foo> --, therefor.

In column 18, line 3, delete "Ti" and insert -- T1 --, therefor.